United States Patent
Selle (10) Patent No.: US 11,650,796 B2
(45) Date of Patent: May 16, 2023

(54) METHOD FOR ASSISTING A UTILIZER IN CREATING A SOFTWARE APPLICATION AND COMPUTER PROGRAM HAVING AN IMPLEMENTATION OF THE METHOD AND ALSO PROGRAMMING INTERFACE USABLE FOR SUCH METHOD

(71) Applicant: SIEMENS AKTIENGESELLSCHAFT, Munich (DE)

(72) Inventor: Sven Selle, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 50 days.

(21) Appl. No.: 16/629,765

(22) PCT Filed: Jun. 13, 2018

(86) PCT No.: PCT/EP2018/065585
§ 371 (c)(1),
(2) Date: Jan. 9, 2020

(87) PCT Pub. No.: WO2019/011559
PCT Pub. Date: Jan. 17, 2019

(65) Prior Publication Data
US 2020/0233646 A1    Jul. 23, 2020

(30) Foreign Application Priority Data
Jul. 10, 2017  (EP) ..................................... 17180475

(51) Int. Cl.
*G06F 8/33* (2018.01)
*G16Y 20/20* (2020.01)
*G06Q 10/101* (2023.01)

(52) U.S. Cl.
CPC ............. *G06F 8/33* (2013.01); *G06Q 10/101* (2013.01); *G16Y 20/20* (2020.01)

(58) Field of Classification Search
None
See application file for complete search history.

(56) References Cited

U.S. PATENT DOCUMENTS

| 10,048,945 B1* | 8/2018 | Makkar | G06F 8/33 |
| 2005/0125766 A1* | 6/2005 | Hawley | G06F 8/33 |
| | | | 717/100 |

(Continued)

FOREIGN PATENT DOCUMENTS

| CN | 104468257 A | 3/2015 |
| CN | 106062790 A | 10/2016 |
| GN | 102682357 A | 9/2012 |

OTHER PUBLICATIONS

European Search Report for European Patent Application No. 17180475.0-1954 dated Nov. 3, 2017.

(Continued)

*Primary Examiner* — Philip Wang
(74) *Attorney, Agent, or Firm* — Lempia Summerfield Katz LLC (57) ABSTRACT

The invention relates to a method for supporting a user when creating an application (10) for accessing IoT data by means of individual or multiple functions (14) comprised by a programming interface (12). While creating the application (10) or in combination with the creation of the application (10), user data (30) which characterizes the user and behavior data (32) are received and/or generated, and a tool (20) which is implemented into software automatically evaluates the user data (30) and the behavior data (32) during the creation of the application (10). On the basis of the data, a recommendation for at least one programming interface (12) function (14) which could be relevant to the user and the (Continued)

application (10) is automatically generated and displayed to the user in order to support the user.

14 Claims, 4 Drawing Sheets

(56) References Cited

U.S. PATENT DOCUMENTS

| | | | |
|---|---|---|---|
| 2010/0269094 A1* | 10/2010 | Levenshteyn | G06F 8/20 717/109 |
| 2012/0079452 A1* | 3/2012 | Nir-Buchbinder | G06F 8/33 717/113 |
| 2012/0210296 A1 | 8/2012 | Boulter et al. | |
| 2012/0290518 A1* | 11/2012 | Flinn | G06F 16/24575 706/12 |
| 2013/0183926 A1 | 7/2013 | Lindberg et al. | |
| 2013/0268912 A1* | 10/2013 | Kizhakkevalappil | G06F 8/33 717/109 |
| 2014/0018034 A1 | 1/2014 | Lindberg | |
| 2014/0047413 A1* | 2/2014 | Sheive | G06F 8/30 717/110 |
| 2015/0040101 A1* | 2/2015 | Rummler | G06Q 10/101 717/113 |
| 2015/0095923 A1* | 4/2015 | Sarid | G06F 8/30 719/328 |
| 2016/0012511 A1* | 1/2016 | Braziunas | G06Q 30/0255 705/14.53 |
| 2016/0103662 A1* | 4/2016 | Di Balsamo | G06F 11/3072 717/107 |
| 2016/0197798 A1* | 7/2016 | Britt | H04L 12/2834 370/254 |
| 2016/0239546 A1* | 8/2016 | Cuomo | G06F 16/248 |
| 2016/0371395 A1* | 12/2016 | Dumant | G06F 16/90324 |
| 2018/0232444 A1* | 8/2018 | Duesterwald | G06F 8/73 |
| 2019/0079753 A1* | 3/2019 | Makkar | G06F 8/36 |

OTHER PUBLICATIONS

PCT International Search Report and Written Opinion of International Searching Authority dated Sep. 4, 2018 corresponding to PCT International Application No. PCT/EP2018/065585 filed Jun. 13, 2018.

* cited by examiner

METHOD FOR ASSISTING A UTILIZER IN CREATING A SOFTWARE APPLICATION AND COMPUTER PROGRAM HAVING AN IMPLEMENTATION OF THE METHOD AND ALSO PROGRAMMING INTERFACE USABLE FOR SUCH METHOD

CROSS REFERENCE TO RELATED APPLICATIONS

This present patent document is a § 371 nationalization of PCT Application Serial Number PCT/EP2018/065585, filed Jun. 13, 2018, designating the United States, which is hereby incorporated in its entirety by reference. This patent document also claims the benefit of EP 17180475.0, filed on Jul. 10, 2017, which is also hereby incorporated in its entirety by reference.

FIELD

Embodiments relate to a method for assisting a utilizer in creating a software application, subsequently referred to as application for short, that is intended for accessing IoT data (Internet of Things data).

BACKGROUND

Programming interfaces may be complex and extensive. The use thereof is more likely a possibility for proficient programmers and even proficient programmers have an almost complete overview of the scope of performance of the programming interface only when the programming interface is used frequently.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments assist a programmer, subsequently referred to as utilizer in creating an application for accessing IoT data.

Embodiments provide a method for assisting a utilizer in creating an application intended for accessing IoT data. The application is intended to access IoT data, also referred to just as data. The IoT data are accessed by the application by single or multiple functions including a programming interface. When the application is created or in connection with the application being created, user data and behavioral data that are characteristic of the utilizer are recorded and/or produced. A software-implemented tool automatically evaluates the user data and/or the behavioral data when the application is created. The result of the evaluation of the user data and the behavioral data that the tool produces is a proposal for at least one function of the programming interface that might be relevant to the utilizer and the application. This proposal is displayed to the utilizer. The display may render the proposed function or a proposed function from a group of multiple proposed functions immediately selectable for use in the respective application. The proposal of at least one function potentially relevant to the utilizer and the display of the function are the assistance that the method provides for the utilizer in creating the respective application.

User-specific assistance is provided, and the assistance thus takes account of the needs of preferences of the utilizer.

Embodiments specify a programming interface that is suitable for use for the method. The programming interface includes and makes available functions for accessing IoT data, includes provision for the creation of an application that uses as a function of the programming interface and/or that use of an application that uses a function of the programming interface to involve characteristic data in this regard—for example, data encoding the use of the respective function—being stored. The data are data that are behavioral data, user data, or user data and behavioral data. The behavioral data encodes for example a behavior of a programmer, that for example involves selecting a specific function of the programming interface and providing the function in an application for accessing IoT data. The user data encodes for example special properties of a respective user. An optional additional capture of the user data involves storing "who" uses a specific function of the programming interface, "who" not necessarily meaning a specific person (utilizer, user) but referring to a property of the person (programmer, developer, etc.). When an application is used, what is captured in the form of the behavioral data is for example which parameters have been used to call a function of the programming interface, for example which data area of the IoT data that call relates to. Besides the automatic capture of the data, the special feature of the programming interface is that the programming interface includes a special function (user comparison function) that makes at least the behavioral data available to a utilizer of the programming interface.

The storing of at least the behavioral data, e.g. the storing of user data and/or behavioral data, is effected or provided at the level of the programming interface and the capability of accessing at least the behavioral data is effected or provided at the level of the programming interface, by the user comparison function, at a central point. The usability of at least the behavioral data is independent for example of a development environment that is intended for creating an application and by which the data capture and an access capability are fundamentally realizable. Behavioral data for a programmer that have arisen in the course of creation of an application may also be evaluated for the automatic generation of proposals relating to a use and/or configuration of an application, for example by virtue of data, data memories, etc. suitable for use in an application or by an application being ascertained and automatically proposed. The data etc. has been selected to date using a user interface and not by a special development environment. The user interface includes data rendered, for example all fundamentally available data selectable. A similar complexity or lack of transparency to that previously explained for the scope of functions of a programming interface is thus obtained. If when using an application, for example, when selecting the data to be handled or processed by the application, it is known which functions of the programming interface the programmer of the application has used and/or which data are processible by the functions used, the whole of the fundamentally available data may be usefully limited. The automatic limitation permits faster and less error-prone selection of the data to be handled or processed by the application. Embodiments also include a method for assisting a utilizer in an application and/or configuration of a software application.

Embodiments of the method relate to how at least one function of the programming interface is automatically identifiable as a function that is probably relevant to the utilizer or the application.

In one embodiment, the behavioral data of the utilizer is used to ascertain which function or which functions of the programming interface the utilizer has already used previously. The previous use is logged in the behavioral data, for example, by virtue of, for each function used, not only the circumstance of the use but also a number encoding the frequency of use being part of the behavioral data. A function already used by the utilizer is potentially a function that the utilizer may also use again. The utilizer then knows the way the function works, e.g. the utilizer might therefore already be inclined to use it again. Furthermore, a function that has already been used is clearly a function that is fundamentally a possibility for solving a problem faced by the utilizer. If the behavioral data also encodes the frequency of the use of a function, the data may provide a further strong indication of a potential relevance of a function.

The behavioral data is automatically evaluable by the tool and is evaluated by the tool automatically in connection with the creation of the respective application, so that, to assist the utilizer, the tool may automatically produce a proposal for at least one function of the programming interface that might be relevant to the utilizer and the application and automatically produces the proposal in the course of the execution of the application.

In an embodiment, a function that is probably relevant to the utilizer and the application is automatically detected from the fact that IoT data that the utilizer has already used, for example, has repeatedly used, according to the behavioral data that is processible by the function. The tool automatically evaluates the behavioral data. The behavioral data encodes a possible use of specific IoT data and optionally also a frequency of the use. By evaluating the behavioral data, the tool may select a function by which the IoT data are processible as a potentially relevant function. The tool then additionally processes a database that encodes a relationship between IoT data and functions intended for handling them, for example in the form of one or more graphs.

The automatic selection by the tool is not restricted to the processing of the behavioral data of the respective utilizer. Behavioral data of other utilizers—subsequently referred to as "programmers" merely for the purpose of better distinction—may also provide clues about a function that is relevant to the respective utilizer. If for example other programmers use a function or specific functions, or even use it/them particularly frequently, this is an indication that the relevant function or the relevant functions might also be relevant to the respective utilizer. The tool evaluates not the behavioral data of the respective utilizer but rather the behavioral data of at least one other programmer, optionally of multiple other programmers, for example, in the broadest sense of the user behavior of other programmers. Optionally, the tool automatically also evaluates which IoT data another programmer uses or other programmers use in order, as part of the functionality of the tool, to propose to the respective utilizer a function or multiple functions of the programming interface that are suitable for processing the IoT data as potentially relevant functions.

An automatic evaluation of the user behavior of other programmers by the tool and a "similarity" of the respective utilizer and another programmer or multiple other programmers is also automatically detectable by the tool. The tool evaluates the respective user data. If the user data reveal for example that the respective utilizer and at least one other programmer are working in the same company, this may automatically be evaluated by the tool as an indication that the respective utilizer is presumably interested in the same functions, data and/or data memories as the other programmer has already also used according to his behavioral data. Additionally, for example if the stored user data for other programmers include user data of at least one programmer (and the user data are automatically ascertained by the tool) that reveal that the respective utilizer and the at least one other programmer have the same or similar jobs in their respective company. This too is an automatically evaluable indication that the respective utilizer is presumably interested in the same functions, data and/or data memories as the other programmer has already also used according to the behavioral data.

If the tool is used to carry out the evaluations in succession in regard to individual criteria (company, job, etc.) and respective overlaps and accordingly presumably relevant functions, etc. are revealed for the respective utilizer in the process, it is possible for the proposals to be prioritized for the respective utilizer on the basis of a quantitative rating of the overlap that is carried out automatically by the tool. If for example it is revealed that another programmer works in the same company and includes the same or a similar job there, this justifies the assumption that the functions etc. used by the programmer to date according to his behavioral data might be of greater relevance to the respective utilizer than functions etc. used by a different programmer again who "only" works in the same company or "only" includes the same or a similar job in a different company.

The functions described as a function of the tool apply to the programming interface, for example a programming interface including a user comparison function that implements the functions described as a function of the tool. The programming interface results in the scope of the tool being reduced because the tool calls the user comparison function, that then includes the functions otherwise implemented as functions of the tool.

A method is also provided for automatic execution in the form of a computer program. Embodiments also include a computer program including program code instructions executable by a computer and a storage medium including the computer program, for example, a computer program product including program code. Embodiments also include a programming device for creating an application for accessing IoT data by single or multiple functions that a programming interface includes and in whose memory the computer program is loaded or loadable for performing the method and the configurations thereof.

DETAILED DESCRIPTION

The Internet of Things (IoT) may be regarded as a network of items and/or apparatuses that includes integrated sensors in the form of sensors associated with the items or apparatuses, so that recording of data and data interchange are possible. The items or apparatuses that a network includes include for example machines, installations, installation parts and generally automated technical installations with the control hardware they include and also the respectively controlled and/or monitored apparatuses, and the actuators and sensors associated therewith.

A large number of companies are developing solutions and applications for processing and using data produced under the circumstances (IoT data). The applications are also optionally again networked to one another, for example in the form that an application uses for example data that are also used by another application and/or that an application processes data by using a function that is also used by another application. Overall, a platform (IoT platform), that is sometimes also referred to as an "ecosystem" in technical terminology, for accessing and using IoT data is thus obtained.

Figure 1:
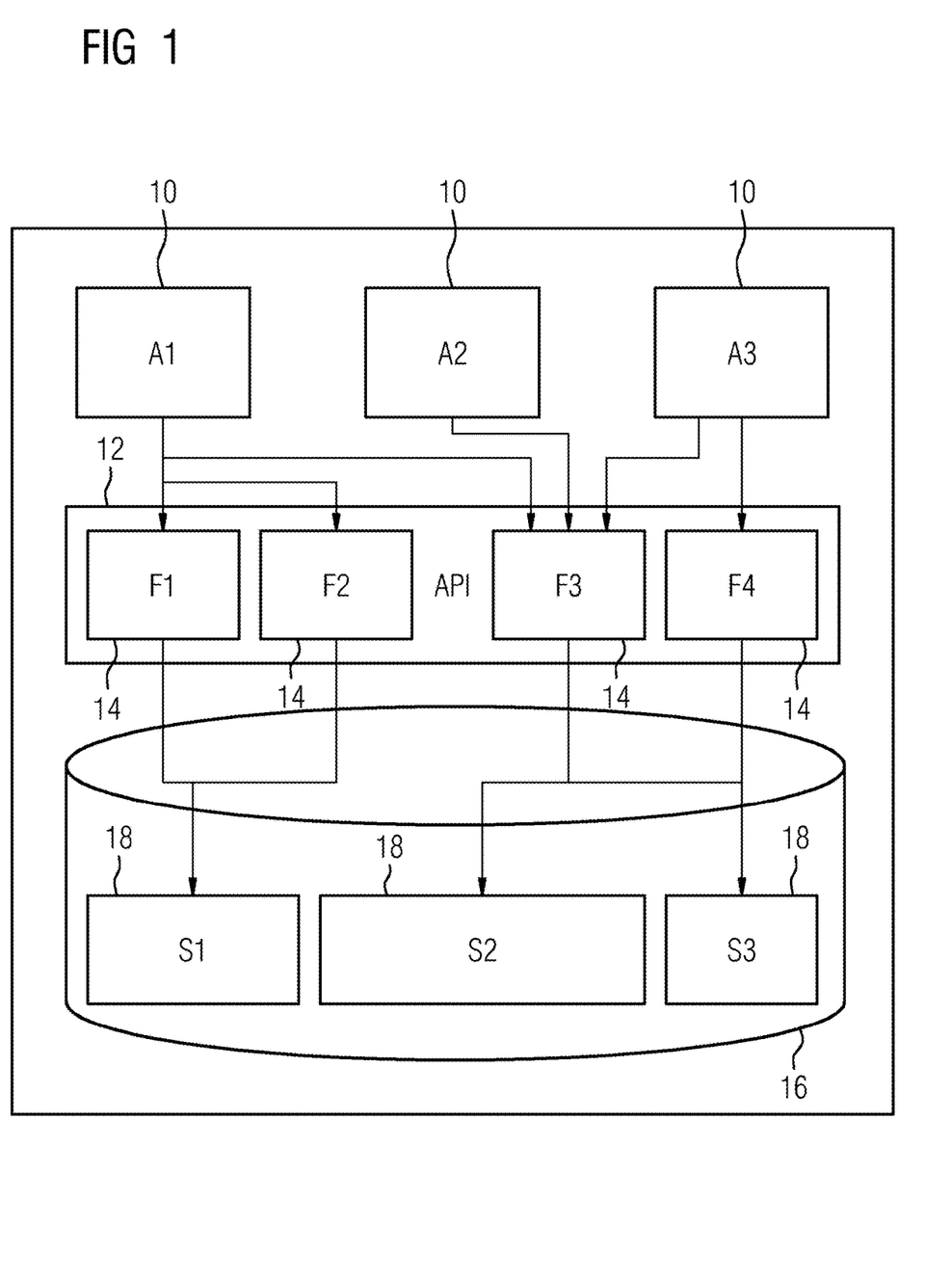
FIG. 1 depicts applications that access IoT data by using functions of a programming interface (API) according to an embodiment.

The depiction in FIG. 1 depicts a schematically simplified view of a plurality of applications 10 that are symbolically denoted by "A1", "A2" and "A3" to distinguish them. The number of applications 10 is fundamentally arbitrary. The applications 10 access IoT data using at least individual functions 14 provided by a programming interface 12 (API). The number of functions 14 within the API 12 is fundamentally likewise arbitrary. The functions 14 shown in FIG. 1 are symbolically denoted by "F1", "F2", "F3" and "F4" to distinguish them. The applications 10 use a function 14 or multiple functions 14 to use and/or process data (IoT data) that are kept in a data pool 16, in particular a data pool 16 formed in what is known as the Cloud, possibly even a distributed data pool 16. The data are for example sensor data recorded by respective sensors, for example in the form of time series or the like. Similar or otherwise associated data may be kept in individual (possibly distributed) memories 18 that together form the data pool 16. The memories 18 shown in FIG. 1 are symbolically denoted by "S1", "S2" and "S3" to distinguish them.

Returning to the general explanations above, the result, on the basis of the situation depicted in FIG. 1, is that the applications 10 symbolically denoted by "A1", "A2" and "A3" all use the function 14 symbolically denoted by "F" and, by virtue of the function, have for example access to data in the memories 18 symbolically denoted by "S2" and "S3".

Instances of application in connection with the or similar data access are visualization of the data, conversion/transformation of the data, calculations, and analyses on the basis of the data, etc. Functions 14 used in the connection may be functions 14 of what is known as a ReST API (Representational State Transfer API), and the API is a concrete example of a programming interface 12 usable for the method proposed in the present case.

The programming interface, or a comparable programming interface, 12 provides a substantial number of functions 14 for accessing individual memories 18 or a plurality of memories 18 and the data kept therein. Individual functions 14 are used more frequently than other functions 14. Specifically depending on the power of the respective programming interface 12, for example, for example depending on the number of functions 14 available on the programming interface 12, the programming interface 12 may end up with a complexity that makes it difficult to clearly see the scope of performance available overall. A utilizer of the programming interface 12 may include the involved task of tackling the respectively provided scope of performance to be able to identify the functions 14 and the data and memory locations thereof that are needed for a respective job. For this, the utilizer requires at least basic programming knowledge allowing the utilizer to identify and understand the system on which the programming interface 12 is based. In addition, the utilizer needs to go through the scope of functions of all available functions 14 at least once in order to be able to assess the actual scope of performance of each individual function 14 and, on the basis thereof, to be able to decide which of possibly multiple possible functions 14 is best suited to a respective job.

The approach proposed in the present case includes the aim of reducing or channeling this involvement.

To date, applications 10 for accessing IoT data have been created by an expert (IT expert), that, on the basis of experience, may comparatively easily provide the overview outlined above. However, this also results in a very limited number of people who are able to create the applications 10.

On the basis of the approach proposed in the present case, there is provision for the utilizer, for example, a utilizer who is not part of the circle of IT experts, to be assisted in creating an application 10 by a tool 20. The tool 20 is implemented as a computer program and shown in schematically simplified fashion in FIG. 2. The computer program is effectively executed in the background as part of a development environment 22 intended for creating an application 10 or in another manner. In the broadest sense, the tool 20 "observes" the utilizer creating the application 10 and/or using the development environment 22. The results of this observation form the basis for the assistance for the utilizer that is automatically provided by the tool 20.

Figure 2:
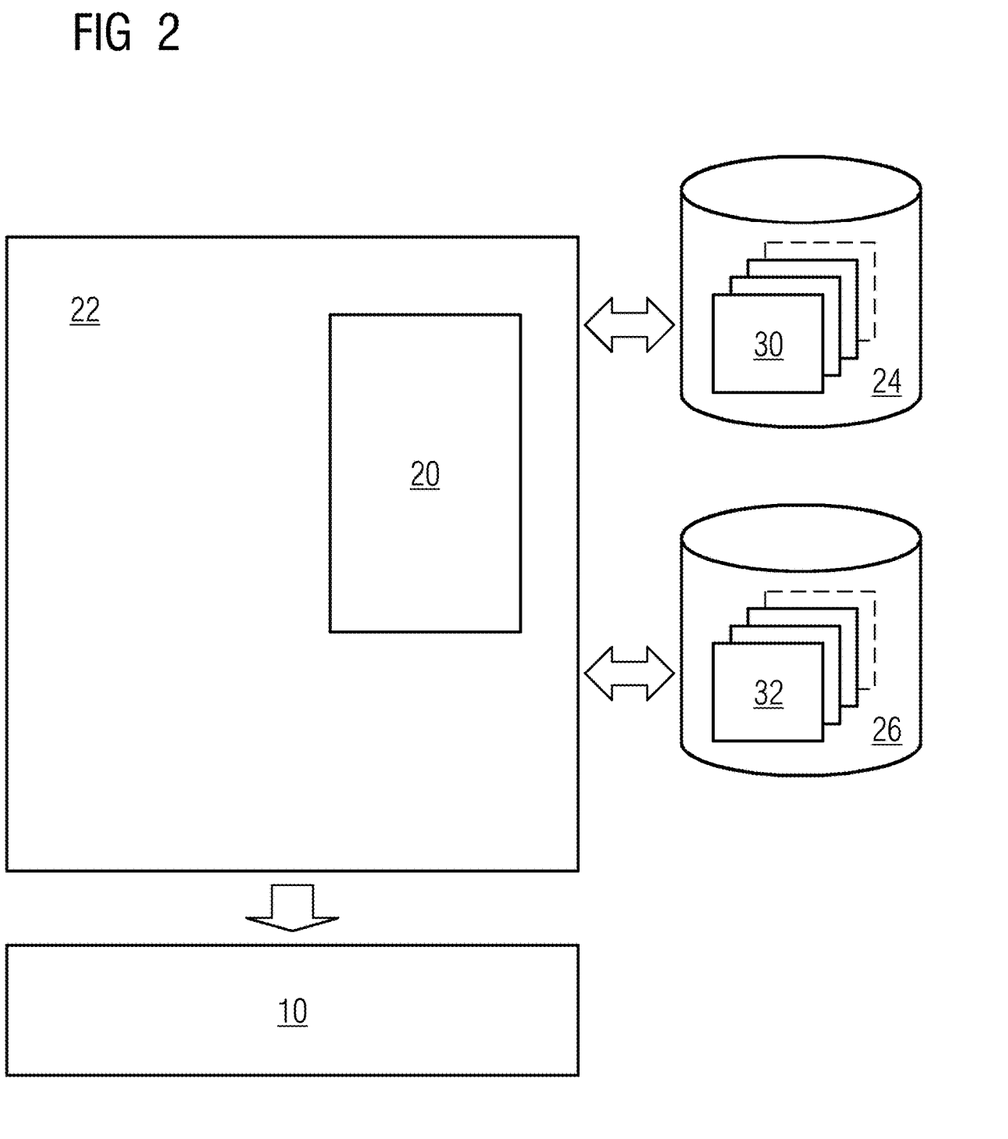
FIG. 2 depicts a tool that uses the approach proposed in the present case to assist a utilizer in creating an application as shown in FIG. 1 according to an embodiment.

The depiction in FIG. 2 also depicts the data used by the tool 20 for the automatic assistance in schematically simplified form. To allow better distinction between the data, a first database 24 and a second database 26 are shown therefor. The first database 24 includes user data 30. The second database 26 includes behavioral data 32. The tool 20 automatically creates the data 30, 32 and stores them in the respective database 24, 26, and uses these data 30, 32 for automatically assisting the utilizer. The first and second databases 24, 26 may be physically associated with the same memory or different memories.

The user data 30 captured, for example for each utilizer, are an identifier (UserID) identifying the utilizer, a company for which the utilizer works, a position of the utilizer in the respective company and/or security-specific information (security role) for example regarding the authorizations of the utilizer when using the respective IoT platform. Furthermore, it is additionally or alternately possible for the time (date or date and time as a timestamp) at which the user data 30 were first created for the relevant utilizer also to be stored as part of the user data 30.

A data record having user data 30 accordingly includes the following information, for example:
a. UserID
b. Company
c. Position in the company
d. Security role
e. Timestamp The behavioral data 32 captured are data that arise during the use of the development environment 22 by the utilizer and/or during the use of the programming interface 12 and are characteristic of the respective user behavior.

A data record having behavioral data 32 includes the following information, for example:
a. UserID
b. Timestamp c. Function(s) 14 used
d. Parameters of a function 14 used or of functions 14 used
e. Data/data memories 18 used The identifier uniquely denoting the utilizer (UserID) may be used to combine the user data 30 of a utilizer and the behavioral data 32 of the utilizer.

In the course of an application 10 or multiple applications 10 being created, increasingly more detailed behavioral data 32 arise for the respective utilizer, for example by virtue of the behavioral data 32 used to record that the utilizer frequently uses one and the same function 14 or specific functions 14 from a group of functions 14. The information alone may be used on the basis of an automatic evaluation by the tool 20 to assist the utilizer by virtue of the utilizer being provided with the or each frequently used function 14 as a matter of priority in the course of an opportunity for selecting a function 14. The provision as a matter of priority may be accomplished for example by virtue of a function 14 or individual functions 14 displayed at the beginning of a list of functions 14 available for selection. An alternative option is for example, when the functions 14 available for selection are presented in the form of a tree, for frequently used functions 14 to be combined by a node of the tree and for the a node to be optionally shown close to the root of the tree, for example immediately after the root of the tree. The comparable presentation of the functions 14 available for selection provides the utilizer with a quick view of functions 14 frequently used to date and allows the utilizer to select them again just as quickly, e.g. the utilizer does not have to look for a respectively desired function 14 in an extensive list or a complicated tree structure from memory.

It is possible to record which data and/or which data memories 18 the utilizer has used to date, so that the utilizer or a function 14 or multiple functions 14 by which the data are processible are likewise presented to the utilizer in a manner facilitating reselection thereof, for example at the beginning of a list or at a quickly accessible point in a tree structure.

Cross-references may also be produced in a similar manner, however. A utilizer working with the programming interface 12 and the development environment 22 for the first time cannot yet be assisted on the basis of his own behavioral data 32. However, if the utilizer selects specific data and/or data memories 18, the behavioral data 32 of other utilizers may automatically be used by the tool 20 to detect which function 14 or which functions 14 the other utilizers have used to access these data or data memories 18. Hence, even a utilizer without behavioral data 32 or with few behavioral data 32 may be provided with automatic assistance by the tool 20 by virtue of functions 14 used by other utilizers being presented in the above-described selection-facilitating manner. The same applies accordingly to a selection of a function 14 by the utilizer without behavioral data 32 or with few behavioral data 32. In this case too, the behavioral data 32 of other utilizers may be automatically used by the tool 20 to make a meaningful proposal to this utilizer regarding data processible by the respective function 14 and/or usable data memories 18.

Figure 3:
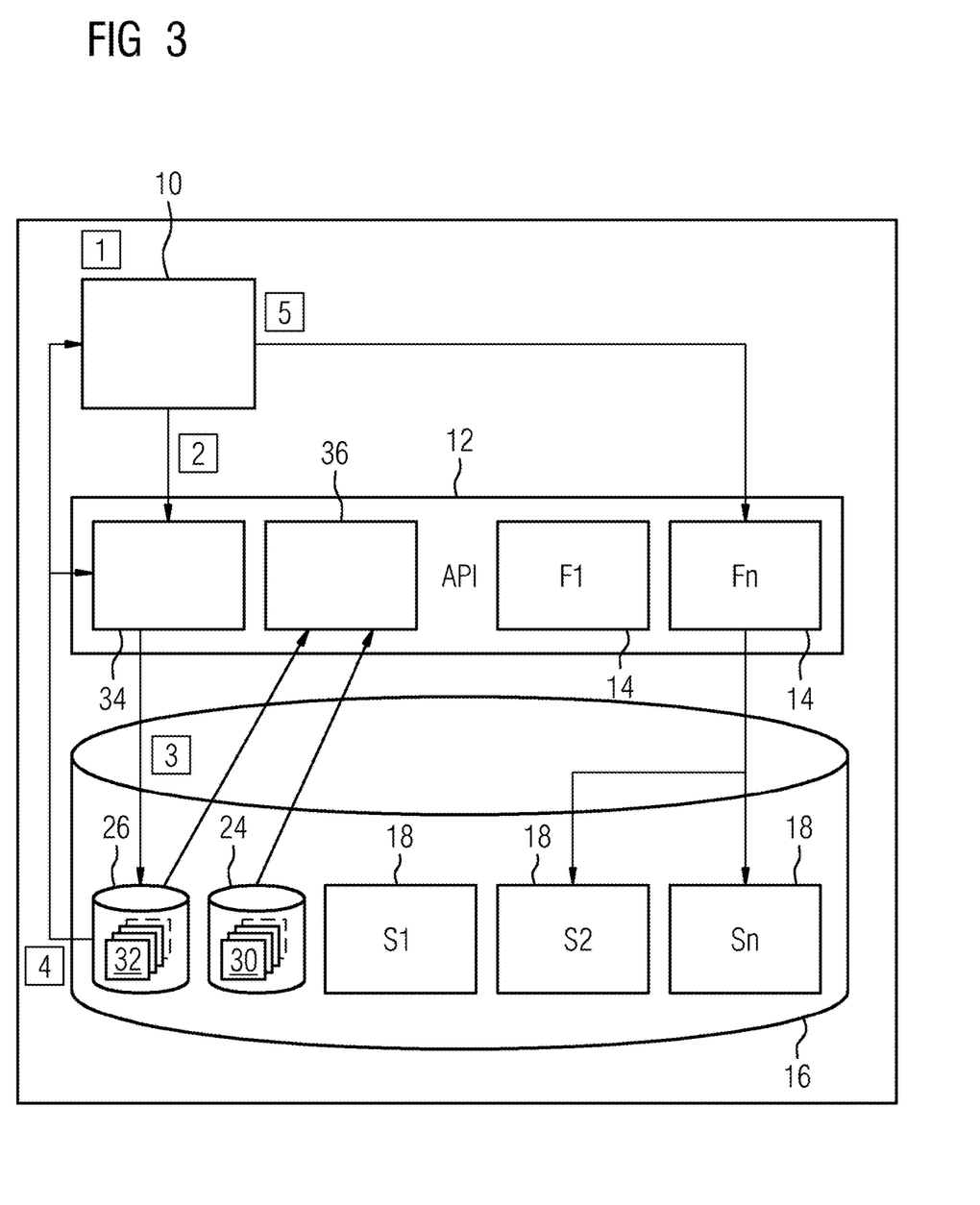
FIG. 3 depicts a simplified depiction of the way in which the tool works according to an embodiment.

The depiction in FIG. 3 depicts a schematically simplified view of a sequence for the use of the tool 20 (FIG. 2). In a first step ("1"), a new application 10 is produced and is started for the first time (if user data 30 do not exist for this utilizer, they are created now and stored in the data pool 16, for example). In a second step ("2"), the tool 20 is used to automatically generate proposals for the utilizer on the basis of the user data 30 and the behavioral data 32 of the respective utilizer (the programmer of the new application 10). If behavioral data 32 do not yet exist or if behavioral data 32 are possibly inadequate, the a proposal is not made and the utilizer is provided with, for example instead of a selection option generated specifically for the utilizer as described above, a selection option (for example presented on a screen) that covers the entire scope of functions of the programming interface 12. A software-implemented data access function 34 associated with the programming interface 12 is used to monitor and capture a respective selection by the utilizer, for example a selection of a function 14 or of multiple functions 14 and/or a selection of a data memory 18 or of multiple data memories 18 or data kept therein. The capture takes place in the behavioral data 32 of the utilizer creating the respective application 10. In a third step ("3"), probable functions 14, data memories 18 and/or data are identified on the basis of the user data 30 and the behavioral data 32. A probable function 14 is a function 14 that might be relevant to the utilizer. The relevance is obtained for example from the behavioral data 32 if the utilizer has already used this function 14 earlier, or from the behavioral data 32 if the utilizer has selected data retrievable and/or processible with this function 14, etc. Additionally, or alternatively, the user data 30 and/or behavioral data 32 of other programmers may also be evaluated. In a fourth step ("4"), a proposal is produced and displayed. A possible selection option automatically generated by the tool 20 is shown in schematically simplified fashion in the depiction in FIG. 4. The fundamentally available functions 14 are displayed in a list 38 and hence provided for selection. A function 14 that is particularly relevant to the utilizer is displayed at a prominent position, for example in first place, in the list 38.

Figure 4:
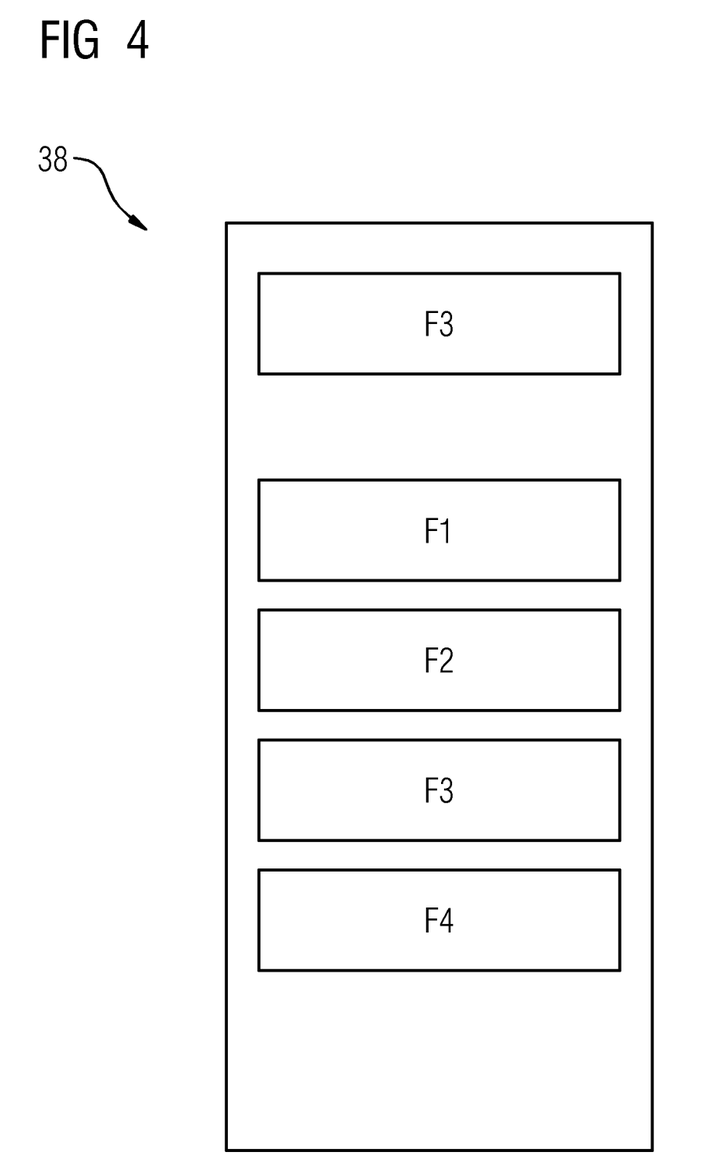
FIG. 4 depicts a list as an example of an output generated by the tool in order to assist the utilizer according to an embodiment.

A probability is obtained from a presumed relevance to the utilizer that is ascertained on the basis of the evaluation of the user data 30 and the behavioral data 32. In a subsequent fifth step ("5"), the utilizer (or optionally also the tool 20 for the utilizer) selects for example a function 14, a data memory 18 and/or data for use in the respective application 10. This results in concretized behavioral data 32 that are taken into consideration in a cyclic sequence of steps "2", "3", "4" and "5".

A separate aspect is that the tool 20 may use the user data 30 and the behavioral data 32 to automatically make proposals for probably relevant functions 14, data, data memories 18, etc.—as described—but that the programming interface 12 is the central pivot and hinge point for the capture of the data and hence, the programming interface 12 itself—in an applicable, fundamentally optional configuration—includes data that characterize the previous use of the programming interface by various users.

The information thus available on the programming interface 12 may be requested in the course of a call to a special function. The special function is subsequently referred to as user comparison function 36 to distinguish it. The various users of the programming interface 12 are thus denoted as follows in order to distinguish them: a utilizer is the person or group of people for whom information regarding previous use of the programming interface 12 is supposed to be ascertained through use of the user comparison function 36. A user is any person or group of people for whom user data 30 and behavioral data 32 have already been produced during the use of the programming interface 12. A utilizer is likewise a user in this sense, but possibly a first-time user.

A call to the user comparison function 36 by the a utilizer or for the a utilizer is supposed, by accessing the information available on the programming interface 12 (user data 30, behavioral data 32), to ascertain whether another user has already used or is currently using the programming interface 12 in a manner that may also be expected for the respective utilizer.

A call by a utilizer is for example a call as arises when creating an application 10. The utilizer uses a development environment 22 to create the respective application 10. The development environment includes a tool 20 of the type described above or calls the tool 20. The tool 20 calls the user comparison function 36. The call is thus made indirectly by the utilizer who is using the development environment 22 and hence the tool 20 (call by the utilizer).

A call for a utilizer is for example a call as arises when using, for example configuring, an already available application 10. The utilizer configures the application 10 by a user interface. A computer program for displaying and evaluating the user interface calls the user comparison function 36. The call is made by the computer program and for the utilizer who is using the computer program (call for the utilizer). The utilizer registers with the computer program in order to use the application to obtain access to the computer program and authorization for use thereof. The application involves a username and password being requested and checked against stored user data in the manner fundamentally known per se, for example. The application accordingly provides the computer program with access to user data usable for calling the user comparison function 36. The computer program may furthermore store further data for the utilizer—in the same way as has been described above for the development environment 22. The computer program therefore optionally also includes data usable as behavioral data when calling the user comparison function 36.

The user comparison function 36 is called for example using the utilizer and/or behavioral data 30, 32 of the respective utilizer as parameters, and the user comparison function 36 involves matches automatically being ascertained in the database 24 with user data 30 and/or in the database 26 with behavioral data 32. The matches are ascertained automatically as part of the functionality of the user comparison function 36 (or of a further function called by this special function 36). There is a match in regard to the user data 30 for example if, in the database 24 with user data 30, a data record is found that was created for a user who works in the same company as the utilizer. It may then be assumed that the utilizer needs similar data, data memories 18 and/or functions 14. The data, data memories 18 and/or functions 14 that the user for whom the ascertained user data 30 were created has used may thus be proposed to the utilizer in the manner described above.

The special feature as compared with the automatic assistance of a utilizer in creating an application 10 described above is that the assistance already exists at the level of the programming interface 12 and is provided even if the utilizer does not want or have to create any application 10, but rather wants to use an already existing application 10. The utilizer is then assisted for example in selecting those data and/or data memories 18 that are supposed to be handled and/or processed by the respective application 10 by the results of the user comparison function 36. The user comparison function 36 then includes (either itself or in the form of one or more further functions callable by the user comparison function 36) the functionality described above in connection with the explanation of the functionality of the tool 20.

Embodiments also include a programming interface 12 that includes at least one the user comparison function 36 that, when called, provides information about a current and/or historical use of the programming interface 12 and the functions 14 it includes by other users.

The user comparison function 36 may act as an interface, for example as a single interface, between the tool 20 explained above and the stored user data 30 and behavioral data 32. All or some of the functionality described above in connection with the explanation of the functionality of the tool 20 may then be implemented as a functionality of the user comparison function 36 or of one or more further functions callable by the user comparison function 36.

Individual emphasized aspects of the description may be b summarized as follows: what is specified is a method for assisting a utilizer in creating an application 10 that is intended for accessing IoT data and that involves the access being effected by single or multiple functions 14 that a programming interface 12 includes. The method has provision for, when the application 10 is created or in connection with the application 10 being created, user data 30 and behavioral data 32 that are characteristic of the utilizer to be recorded and/or produced, and for a software-implemented tool 20 to automatically evaluate the user data 30 and the behavioral data 32 and to take the data as a basis for automatically producing, as assistance for the utilizer, a proposal for at least one function 14 of the programming interface 12 that might be relevant to the utilizer and the application 10, and to display the proposal to the utilizer, when the application 10 is created. What is additionally specified is a programming interface 12 that is usable for the a method and also a programming interface that is usable independently of the performance of the a method, and that automatically and independently detects the type of use of the programming interface 12, for example, the functions 14 used, for different utilizers/users and makes the type of use available for an evaluation.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system operative to implement a programming interface including functions for accessing IoT data, the system including a computer processor coupled with a memory, the computer processor specifically configured to implement the programming interface comprising:
   a user comparison function configured to record at least behavioral data by a first user during a creation or use of an application;
   wherein the user comparison function is configured to make at least the behavioral data available to a second user of the programming interface;
   wherein the user comparison function is further configured to automatically select and recommend a function of the programming interface that is relevant to the second user based on the behavioral data of the the first user that indicates the function was relevant to the first user.

2. The system of claim 1, wherein the user comparison function is callable by or for the second user and wherein the user comparison function is callable by the second user with at least one parameter that characterizes the second user, user behavior thereof, or the second user and the user behavior thereof.

3. The system of claim 1, wherein the user comparison function automatically evaluates the behavioral data of the first user and takes the behavioral data as a basis for automatically producing, as assistance for the second user a proposal for the function of the programming interface.

4. A method for assisting a first user in creating an application for accessing IoT data by single or multiple functions that a programming interface comprises, the method comprising:
recording, when the application is created or in connection with the application being created, user data and behavioral data for a second user;
evaluating, automatically by a software-implemented tool, the user data, the behavioral data, or the user data and the behavioral data;
producing, automatically as assistance for the first user, a proposal for at least one function of the programming interface that is relevant to the first user and the application based on the evaluating, automatically by a software-implemented tool the user data, the behavioral data, or the user data and the behavioral data; and
displaying the proposal to the first user when the application is created.

5. The method of claim 4,
wherein a function that is relevant to the first user and the application is a function that the second user has already used according to the behavioral data,
wherein the function is automatically selected by the software-implemented tool on the basis of the behavioral data.

6. The method of claim 4,
wherein a function that is relevant to the first user and the application is a function by which data that the first user has already used according to the behavioral data are processible,
wherein the function is automatically selected by the software-implemented tool on the basis of the behavioral data.

7. The method of claim 4,
wherein a function that is relevant to the first user and the application is a function that the second user has already used according to behavioral data of the other utilizer,
wherein the function is automatically selected by the software-implemented tool on the basis of the behavioral data of the second user.

8. The method of claim 4,
wherein a function that is relevant to the first user and the application is a function by which data that another utilizer has already used according to behavioral data of the second user are processible,
wherein the function is automatically selected by the tool on the basis of the behavioral data of the another utilizer.

9. The method of claim 4,
wherein the programming interface comprises a user comparison function that is configured to make at least behavioral data available to a utilizer of the programming interface,
wherein a creation or a use of an application that uses a function of the programming interface involves characteristic data comprising at least behavioral data that encodes a use of the function.

10. The method of claim 9,
wherein the software-implemented tool accesses the user data, or the behavioral data, or the user data and the behavioral data by calling the user comparison function of the programming interface.

11. A non-transitory computer readable storage medium comprising a set of computer-readable instructions stored thereon operative to implement a programming interface, the set of computer-readable instructions instructions which, when executed by at least one processor cause the at least one processor to:
record, when an application is created or in connection with the application being created by a first user, user data and behavioral data;
evaluate, automatically by a software-implemented tool, the user data, the behavioral data, or the user data and the behavioral data;
produce, automatically as assistance for a second user, a proposal for at least one function of the programming interface that is relevant to the second user and the application based on a result of the computer-readable instructions configured to evaluate the user data, the behavioral data, or the user data and the behavioral data; and
display the proposal to the second user when the application is created.

12. The non-transitory computer readable storage medium of claim 11,
wherein a function that is relevant to the second user and the application is a function that the second user has already used according to the behavioral data,
wherein the function is automatically selected by the software-implemented tool on the basis of the behavioral data.

13. The non-transitory computer readable storage medium of claim 11,
wherein a function that is relevant to the second user and the application is a function by which data that the second user has already used according to the behavioral data are processible,
wherein the function is automatically selected by the software-implemented tool on the basis of the behavioral data.

14. The non-transitory computer readable storage medium of claim 11,
wherein a function that is relevant to the second user and the application is a function by which data that the first user has already used according to behavioral data of the first user are processible,
wherein the function is automatically selected by the tool on the basis of the behavioral data of the first user.

* * * * *